US009701344B2

(12) United States Patent
Kodama et al.

(10) Patent No.: US 9,701,344 B2
(45) Date of Patent: Jul. 11, 2017

(54) FRAME STRUCTURE FOR VEHICLE

(71) Applicant: MAZDA MOTOR CORPORATION, Hiroshima (JP)

(72) Inventors: Yuki Kodama, Aki-gun (JP); Chikara Kawamura, Hiroshima (JP); Masanori Honda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/042,602

(22) Filed: Feb. 12, 2016

(65) Prior Publication Data
US 2016/0251035 A1    Sep. 1, 2016

(30) Foreign Application Priority Data

Feb. 27, 2015    (JP) ................. 2015-037806

(51) Int. Cl.
*B62D 21/15*    (2006.01)

(52) U.S. Cl.
CPC ................. *B62D 21/152* (2013.01)

(58) Field of Classification Search
CPC ............. B62D 21/152; B62D 25/08
See application file for complete search history.

(56) References Cited

U.S. PATENT DOCUMENTS

| | | | | |
|---|---|---|---|---|
| 3,794,348 A | * | 2/1974 | Fischer | B62D 21/152 188/371 |
| 3,827,712 A | * | 8/1974 | Suzuki | B62D 21/152 280/784 |
| 3,983,962 A | * | 10/1976 | Torke | F16F 7/12 188/377 |
| 4,057,263 A | * | 11/1977 | Schwuchow | B62D 21/152 280/797 |
| 4,413,840 A | * | 11/1983 | Shah | B62D 27/04 280/784 |
| 4,684,151 A | * | 8/1987 | Drewek | B62D 21/152 280/784 |
| 4,702,515 A | * | 10/1987 | Kato | B62D 21/152 188/377 |

(Continued)

FOREIGN PATENT DOCUMENTS

| | | | | |
|---|---|---|---|---|
| DE | 3826958 C2 | * | 6/2001 | ........... B62D 21/152 |
| DE | 10151006 A1 | * | 4/2003 | ............. B62D 21/09 |

(Continued)

*Primary Examiner* — Dennis H Pedder
*Assistant Examiner* — Paul Chenevert
(74) *Attorney, Agent, or Firm* — Studebaker & Brackett PC

(57) ABSTRACT

A bead portion is provided at a compression-side wall portion to be recessed toward an inside of a main closed cross section. A first reinforcing member is provided in the closed cross section and joined to a tension-side wall portion so as to form a first sub cross section extending in a longitudinal direction between the tension-side wall portion and the first reinforcing member. A second reinforcing member is provided in the closed cross section and joined to a portion of the compression-side wall portion where the bead portion is provided so as to form a second sub cross section extending vertically between the portion of the compression-side wall portion and the second reinforcing member. The first and second reinforcing members are configured to be spaced apart from each other.

6 Claims, 9 Drawing Sheets

(56) References Cited

U.S. PATENT DOCUMENTS

| | | | | |
|---|---|---|---|---|
| 6,152,521 A * | 11/2000 | Hayashi | ............... | B62D 21/152 296/187.09 |
| 6,406,088 B1 * | 6/2002 | Tate | ............... | B62D 21/152 188/371 |
| 6,695,393 B1 * | 2/2004 | Aouadi | ............... | B62D 21/152 296/187.09 |
| 6,793,274 B2 * | 9/2004 | Riley | ............... | B62D 29/002 296/187.03 |
| 7,097,235 B2 * | 8/2006 | Yasukouchi | ............... | B62D 21/152 296/187.03 |
| 7,185,945 B2 * | 3/2007 | Dandekar | ............... | B62D 21/152 296/187.09 |
| 8,596,711 B2 * | 12/2013 | Yasui | ............... | B60R 19/34 296/187.09 |
| 9,016,416 B2 * | 4/2015 | Yamaguchi | ............... | B62D 21/152 180/68.4 |
| 9,145,170 B2 * | 9/2015 | Mori | ............... | B62D 21/152 |
| 9,399,489 B2 * | 7/2016 | Iwama | ............... | B62D 25/082 |
| 2007/0228769 A1 * | 10/2007 | Dandekar | ............... | B60J 5/0451 296/146.6 |
| 2009/0236166 A1 * | 9/2009 | Kowaki | ............... | B62D 21/152 180/232 |
| 2009/0243336 A1 * | 10/2009 | Honji | ............... | B62D 21/152 296/187.09 |
| 2016/0347371 A1 * | 12/2016 | Cazes | ............... | F16F 7/123 |
| 2017/0036699 A1 * | 2/2017 | Asai | ............... | B62D 21/152 |

FOREIGN PATENT DOCUMENTS

| | | | | |
|---|---|---|---|---|
| DE | 10309636 A1 * | 9/2004 | ........... | B62D 21/152 |
| FR | 2857932 A1 * | 1/2005 | ........... | B62D 21/152 |
| FR | WO 2008056073 A1 * | 5/2008 | ........... | B62D 21/152 |
| JP | EP 1690722 A2 * | 8/2006 | ............... | B60K 5/12 |
| JP | 2009-137523 A | 6/2009 | | |

* cited by examiner

FRAME STRUCTURE FOR VEHICLE

BACKGROUND OF THE INVENTION

The present invention relates to a frame structure for a vehicle, in which a frame has a roughly rectangular main cross section which absorbs impact energy through its bending deformation in a vehicle collision.

Conventionally, passenger's protection in a vehicle head-on collision has been achieved by a structure in which an axially-crushable (deformable) crash can is provided at a tip portion of a high-tension steel-plate made front side frame and plural impact absorbing mechanisms which are bendable over a range from a middle portion to a rear end portion of the front side frame are provided (Japanese Laid-Open Publication No. 2009-137523). According to the impact absorbing mechanisms, an impact load absorbed through bending deformation of the front side frame occupies the most energy which has been absorbed, so that the energy-absorption characteristics of the bending deformation affects the EA (Energy Absorption) performance greatly more than the energy-absorption characteristics of the compressive deformation.

Accordingly, it can be considered to improve the strength and the EA performance against the bending by providing a sub closed cross section which is long in a bending direction inside the main closed cross section.

Herein, while the load to start bending of the frame is increased by providing a reinforcing member which forms the sub closed cross section, simply providing this reinforcing member delays the timing of starting the frame's bending in an initial stage of the vehicle collision, so that the collision impact (acceleration) acting on the vehicle may become improperly large temporarily. Also, the weight may increase improperly because the reinforcing member is large sized.

SUMMARY OF THE INVENTION

Accordingly, an object of the present invention is to provide a frame structure for a vehicle which can properly increase the EA (Energy Absorption) and also decrease the bending start load, achieving a light weight structure.

The present invention is a frame structure for a vehicle, in which a frame having a rectangular closed cross section is configured to bend when receiving a vehicle collision load, the bending frame comprising a compression-side panel, a tension-side panel, and a pair of short side panels which connect respective upper and lower end portions of the compression-side panel and the tension-side panel, the frame structure for the vehicle comprising a bead portion provided at the compression-side panel of the frame to be recessed toward an inside of the closed cross section of the frame and extend toward the pair of short side panels of the frame, a first reinforcing member provided in the closed cross section of the frame and joined to an inner face of the tension-side panel of the frame so as to form a first sub cross section extending in a longitudinal direction of the frame between the tension-side panel of the frame and the first reinforcing member, and a second reinforcing member provided in the closed cross section of the frame and joined to an inner face of a portion of the compression-side panel of the frame where the bead portion is provided so as to form a second sub cross section extending toward the pair of short side panels of the frame between the portion of the compression-side panel of the frame and the second reinforcing member, wherein the first and second reinforcing members are configured such that respective inside end portions thereof are spaced apart from each other.

According to the present invention, since the bead portion decreases the load of buckling start, the collision impact (acceleration) acting on the vehicle at the vehicle-collision initial stage can be decreased. Meanwhile, since the first reinforcing member suppresses free deformation of the tension-side panel of the frame, the EA (Energy Absorption) can be increased from the initial stage of the buckling. After the second reinforcing member comes to contact the first reinforcing member, the first reinforcing member suppresses the free deformation of the compression-side panel through the second reinforcing member and also suppresses the free deformation of the tension-side panel of the frame. Accordingly, the respective panels of the frame do not bend simply, but bend in a complex manner including tensioning and compressing, so that the EA (Energy Absorption) can be kept at a properly large level until the second half of the buckling.

In an embodiment of the present invention, the second reinforcing member includes a pair of leg portions which are joined to the inner face of the portion of the compression-side panel of the frame such that the bead portion is interposed between the pair of leg portions of the second reinforcing member.

According to this embodiment, the second reinforcing member does not hinder breaking of (block) the compression-side panel at the position of the bead portion. Further, the load (displacement) caused by the bending of the compression-side panel can be surely inputted to the first reinforcing member through the pair of leg portions.

In another embodiment of the present invention, the second reinforcing member is configured to vertically extend substantially over an entire range of the compression-side panel of the frame.

According to this embodiment, since the outward-protrusion shaped deformation of the short side panels positioned at both end portions of the bead portion which generally occurs at the buckling is suppressed by tensioning of the second reinforcing member so as to extend the short side panels, the EA can be increased properly.

In another embodiment of the present invention, the first reinforcing member is comprised of two members which are provided separately from each other such that two independent first sub cross sections extend in the longitudinal direction of the frame.

According to this embodiment, since the first reinforcing member is comprised of the two members having the two cross sections, the function (performance) that the compression-side panel, the tension-side panel, and the first reinforcing member deform at the buckling, regulating each other, can be strengthened.

In another embodiment of the present invention, the first reinforcing member is made of a single plate such that a middle portion of the single plate which is positioned between the two independent first sub cross sections is joined to the tension-side panel of the frame.

According to this embodiment, since the middle portion directly prevents the tension-side panel from deforming toward the inside of the closed cross section, the free deformation of the tension-side panel can be suppressed effectively.

In another embodiment of the present invention, the compression-side panel and the pair of short side panels are made of a single plate, and the pair of short side panels include a pair of flange portions which are joined to respective end portions of the tension-side panel.

According to this embodiment, since the flange portions are located at the furthest positions from the bead portion, the flange portions do not hinder bending of the frame at the position of the bead portion, so that the buckling start load can be decreased properly.

Other features, aspects, and advantages of the present invention will become apparent from the following description which refers to the accompanying drawings.

DETAILED DESCRIPTION OF THE INVENTION

Figure 1:
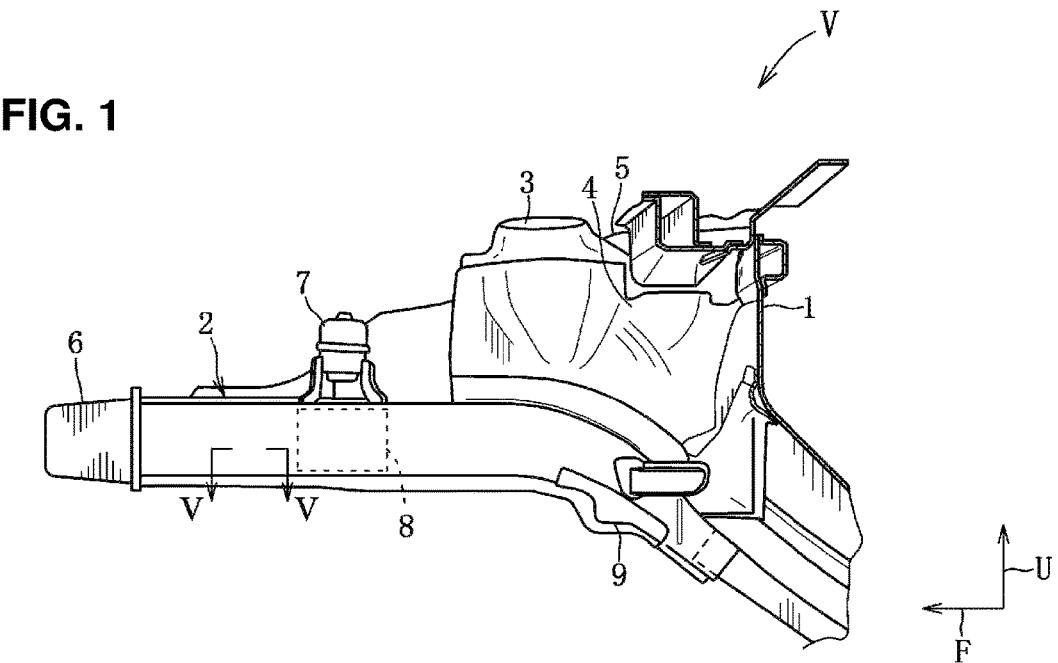
FIG. 1 is a side view of a front side frame according to an embodiment, when viewed from an inside of an engine room.
Figure 2:
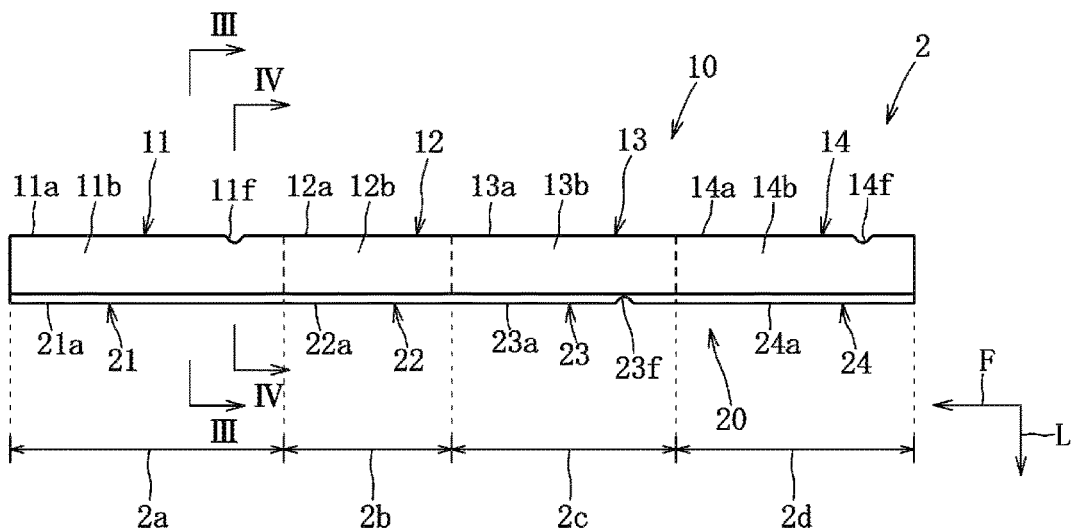
FIG. 2 is a plan view of a right-side front side frame.

Hereafter, an embodiment of the present invention will be described specifically referring to the drawings. The following description exemplifies the embodiment in which the present invention is applied to a front side frame of a vehicle, but an applicable object or an use of the present invention are not to be limited to this embodiment. Herein, in the drawings, an arrow F shows a forward direction, an arrow L shows a leftward direction, and an arrow U shows an upward direction.

The embodiment of the present invention will be described referring to FIGS. 1 through 9. First, a front vehicle-body structure in which a front side frame is provided will be described briefly. As shown in FIG. 1, a vehicle V comprises a dash panel 1 which extends vertically and in a vehicle width direction and partitions an engine room from a vehicle compartment, a front side frame 2 which extends in a vehicle longitudinal direction in front of the dash panel 1, a suspension tower portion 3 which is provided to rise in a tower shape beside the front side frame 2, an apron portion 4 which extends vertically and in the vehicle longitudinal direction and connects the suspension tower portion 3 and the dash panel 1, an apron reinforcement member 5 which extends in the vehicle longitudinal direction at an upper end of the apron portion 4, and others. Herein, the vehicle-body structure is symmetrical, so a right side of the vehicle-body structure will be described primarily, omitting description of a left side of the vehicle-body structure.

A crash can 6 is provided at a front end portion of the front side frame 2. The crash can 6 is configured to have compressive (axially-compressive) deformation when receiving a vehicle head-on collision load so as to absorb part of collision energy. A roughly columnar engine mount 7 is provided at a central portion, in a vehicle longitudinal direction, of the front side frame 2, and a power unit (not illustrated) is resiliently supported by the engine mount 7. Further, a mount reinforcement 8 which increases an attachment rigidity of the engine mount 7 is provided in the front side frame 2 at a position below the engine mount 7. A sub frame bracket 9 for attachment of a suspension sub frame (not illustrated) is fixedly joined to a lower face of a rear portion of the front side frame 2.

Next, the front side frame 2 will be described specifically. As shown in FIGS. 2 through 6, the front side frame 2 is made of a high-tension steel plate through pressing, and has a roughly rectangular main closed cross section C having a longer vertical length and a shorter lateral length. The front side frame 2 has, along its longitudinal direction (a frame longitudinal direction), a front area 2a where a first reinforcement 30 is arranged, a mount area 2b positioned continuously from a rear end of the front area 2a where a mount reinforcement 8 is arranged, an intermediate area 2c which is positioned continuously from a rear end of the mount area 2b where a second reinforcement 40 is arranged, and a rear area 2d which is positioned continuously from a rear end of the intermediate area 2c where a third reinforcement 50 is arranged.

The front area 2a is configured such that when the vehicle has the head-on collision, its front-half portion is made to have an axially-compressive deformation by an impact load which has not been absorbed by the crash can 6 and its rear-half portion is made to bend rightward (outward in a vehicle width direction) by a first bead portion 11f extending vertically. The mount area 2b is configured to be supported in a state in which the mount reinforcement 8 is stored in the main closed cross section C, and the intermediate area 2c is configured such that when the vehicle has the head-on collision, its rear-end side portion is made to bend leftward (inward in the vehicle width direction) by a second bead portion 23f extending vertically and its rear end portion supports the sub frame bracket 9. Further, the rear area 2d is configured such that when the vehicle has the head-on collision, its rear-end side portion is made to bend rightward by a third bead portion 14f extending vertically and its rear end portion is fixed to the dash panel 1.

As shown in FIGS. 2 through 6, the front side frame 2 comprises right-and-left split members, i.e., an outer member 10 having a hat-shaped cross section and a plate-shaped inner member 20. The outer member 10 will be described first. The outer member 10 comprises a first outer portion 11 which forms a right-side portion of the front area 2a, a second outer portion 12 which forms a right-side portion of the mount area 2b, a third outer portion 13 which forms a right-side portion of the intermediate area 2c, and a fourth outer portion 14 which forms a right-side portion of the rear area 2d, which are integrally formed.

The first outer portion 11 comprises a compression-side wall portion 11a (corresponding to a "compression-side plate" in claims) which extends along a face substantially perpendicular to a lateral direction, an upper-end wall portion 11b (corresponding to one of "a pair of short side panels" in claims) which extends leftward from an upper end portion of the compression-side wall portion 11a, a lower-end wall portion 11c (corresponding to the other of "a pair of short side panels" in claims) which extends leftward from a lower end portion of the compression-side wall portion 11a, and others, which are formed integrally. The compression-side wall portion 11a is provided with a first bead portion 11f which is configured to be recessed toward an inside of the main closed cross section C at a rear end portion of the compression-side wall portion 11a. This first bead portion 11f is provided to extend vertically at the compression-side wall portion 11a. The upper-end wall portion 11b and the lower-end wall portion 11c include an upper flange portion 11d and a lower flange portion 11e, respectively. The upper flange portion 11d is configured to extend upward from a left end portion of the upper-end wall portion 11b and the lower flange portion 11e is configured to extend downward from a left end portion of the lower-end wall portion 11c.

The second outer portion 12 comprises a right-side wall portion 12a which extends along the face substantially perpendicular to the lateral direction, an upper-end wall portion 12b which extends leftward from an upper end portion of the right-side wall portion 12a, a lower-end wall portion 12c which extends leftward from a lower end portion of the right-side wall portion 12a, an upper flange portion 12d which extends upward from a left end portion of the upper-end wall portion 12b, and a lower flange portion 12e which extends downward from a left end portion of the lower-end wall portion 12c. The third outer portion 13, which is configured similarly to the first outer portion 11, comprises a tension-side wall portion 13a which extends vertically, an upper-end wall portion 13b which extends leftward from an upper end portion of the tension-side wall portion 13a, a lower-end wall portion 13c which extends leftward from a lower end portion of the tension-side wall portion 13a, an upper flange portion 13d which extends upward from a left end portion of the upper-end wall portion 13b, and a lower flange portion 13e which extends downward from a left end portion of the lower-end wall portion 13c. Further, the fourth outer portion 14 comprises a compression-side wall portion 14a, an upper-end wall portion 14b, a lower-end wall portion 14c, an upper flange portion 14d, a lower flange portion 14e, and a third bead portion 14f, which is configured similarly to the first outer portion 11.

Next, the inner member 20 will be described. As shown in FIGS. 2 through 6, the inner member 20 comprises a first inner portion 21 which forms a left-side portion of the front area 2a, a second inner portion 22 which forms a left-side portion of the mount area 2b, a third inner portion 23 which forms a left-side portion of the intermediate area 2c, and a fourth inner member 24 which forms a left-side portion of the rear area 2d, which are formed integrally.

The first inner portion 21 comprises a tension-side wall portion 21a (corresponding to a "tension-side plate" in claims) which extends along the face substantially perpendicular to the lateral direction, an upper flange portion 21d which extends upward from an upper end portion of the tension-side wall portion 21a, and a lower flange portion 21e which extends downward from a lower end portion of the tension-side wall portion 21a, which are formed integrally. Further, the second inner portion 22 comprises a left-side wall portion 22a which extends along the face substantially perpendicular to the lateral direction, an upper flange portion 22d which extends upward from an upper end portion of the left-side wall portion 22a, and a lower flange portion 22e which extends downward from a lower end portion of the left-side wall portion 22a, which are formed integrally.

The third inner portion 23 comprises a compression-side wall portion 23a (corresponding to the "compression-side plate" in claims) which extends along the face substantially perpendicular to the lateral direction, an upper flange portion 23d which extends upward from an upper end portion of the compression-side wall portion 23a, and a lower flange portion 23e which extends downward from a lower end portion of the compression-side wall portion 23a, which are formed integrally. The compression-side wall portion 23a is provided with a second bead portion 23f which is configured to be recessed toward the inside of the main closed cross section C. This second bead portion 23f is provided to extend vertically at the compression-side wall portion 23a. The fourth inner portion 24 comprises a tension-side wall portion 24a (corresponding to the "tension-side plate" in claims), an upper flange portion 24d, and a lower flange portion 24e, which are formed integrally. This fourth inner portion is configured similarly to the first inner portion 21. The upper flange portions 11d-14d are joined to the upper flange portions 21d-24d, and the lower flange portions 11e-14e are joined the lower flange portions 21e-24e, so that the main closed cross section C extending in the vehicle longitudinal direction is formed.

Next, the first reinforcement 30 will be described. As shown in FIGS. 3-6, the first reinforcement 30 is provided in the main closed cross section C at a position corresponding to the front area 2a, which comprises a first reinforcing member 31 and a second reinforcing member 32. The first reinforcing member 31 is made of a single steel plate through pressing and formed in a longitudinally-long shape. This first reinforcing member 31 comprises a pair of upper-and-lower body portions 31a, each of which has a roughly U-shaped cross section, an upper flange portion 31b which extends upward from an upper end portion of the upper body portion 31a, a lower flange portion 31c which extends downward from a lower end portion of the lower body portion 31a, and a connection portion 31d which interconnects the lower end portion of the upper body portion 31a and the upper end portion of the lower body portion 31a.

Figure 3:
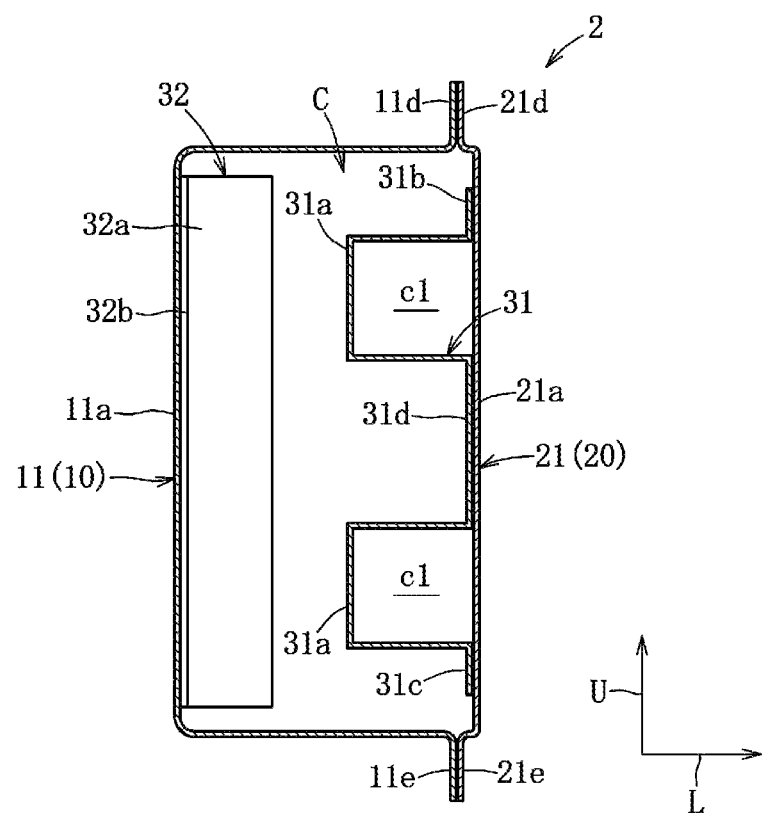
FIG. 3 is a sectional view taken along line III-III of FIG. 2.
Figure 4:
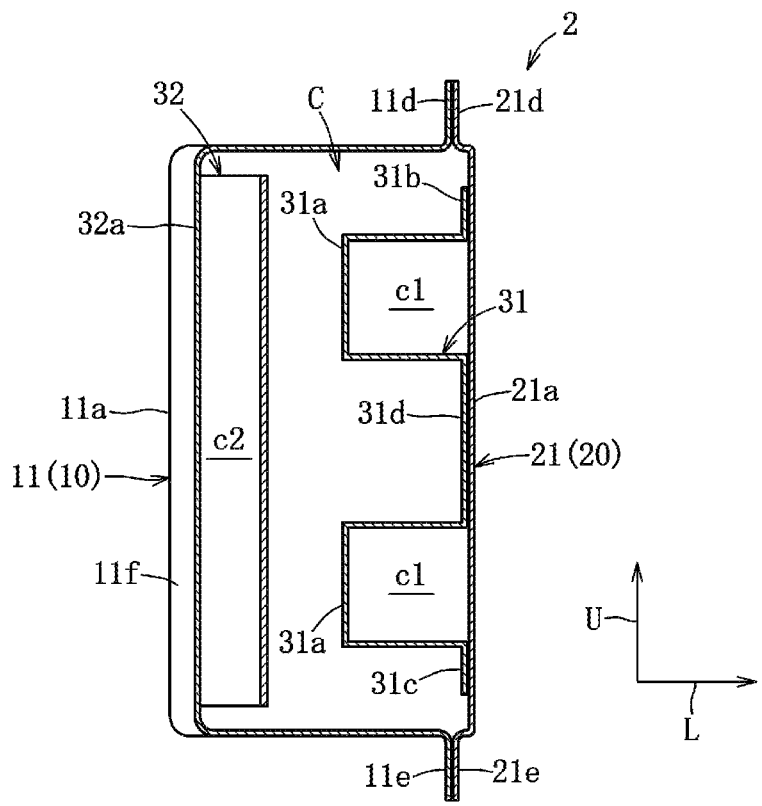
FIG. 4 is a sectional view taken along line IV-IV of FIG. 2.
Figure 5:
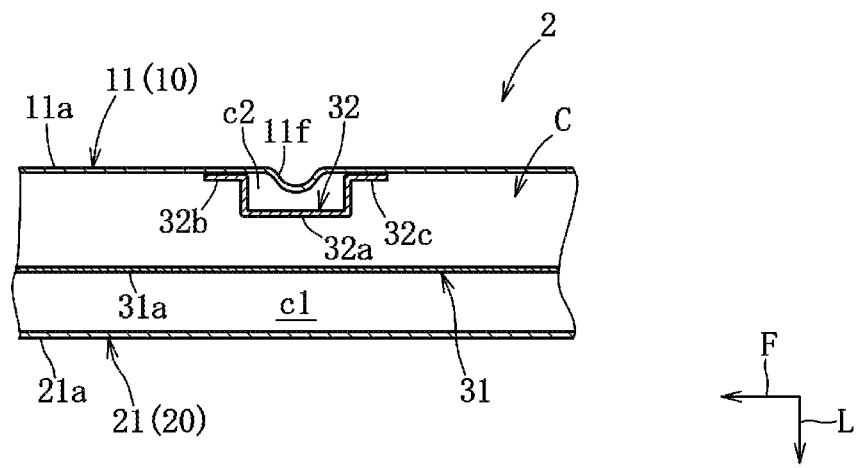
FIG. 5 is a sectional view taken along line V-V of FIG. 1.

The first reinforcing member 31 forms a pair of upper-and-lower first sub closed cross sections c1 by joining the upper flange portion 31b, the lower flange portion 31c, and the connection portion 31d to the tension-side wall portion 21a. As shown in FIGS. 3-5, the pair of first sub closed cross sections c1 are configured such that each of them has a lateral width which is about a half of that of the main closed cross section C and is spaced laterally apart from the compression-side wall portion 11a. A vertical distance (gap) between the pair of sub closed cross sections c1 is set to be larger than a vertical width of the sub closed cross section c1. Accordingly, since a height (lateral width) of the first reinforcing member 31 can be about a half of the lateral width of the main closed cross section C, a superior weight reduction can be achieved according to the present embodiment, compared with a case in which there is provided another reinforcing member having its lateral width which is equal to the lateral width of the main closed cross section C.

The second reinforcing member 32 is made of a single steel plate through pressing and formed in a vertically-long shape. This second reinforcing member 32 comprises a body portion 32a which has a U-shaped cross section, a front flange portion 32b which extends forward from a front end portion of the body portion 32a, and a rear flange portion 32c which extends rearward from a rear end portion of the body portion 32a. The second reinforcing member 32 is joined to the compression-side wall portion 11a at its front flange portion 32b and its rear flange portion 32c in a state in which the body portion 32a faces the bead portion 11f with a specified distance (gap) between the body portion 32a and the bead portion 11f, so that a second sub closed cross section c2 is formed between the second reinforcing member 32 and the compression-side wall portion 11a. As shown in FIGS. 3-5, the second sub closed cross section c2 is configured such that its lateral width is smaller than the half of the lateral width of the main closed cross section C, and is spaced apart from the first reinforcing member 31 in the lateral direction.

Figure 6:
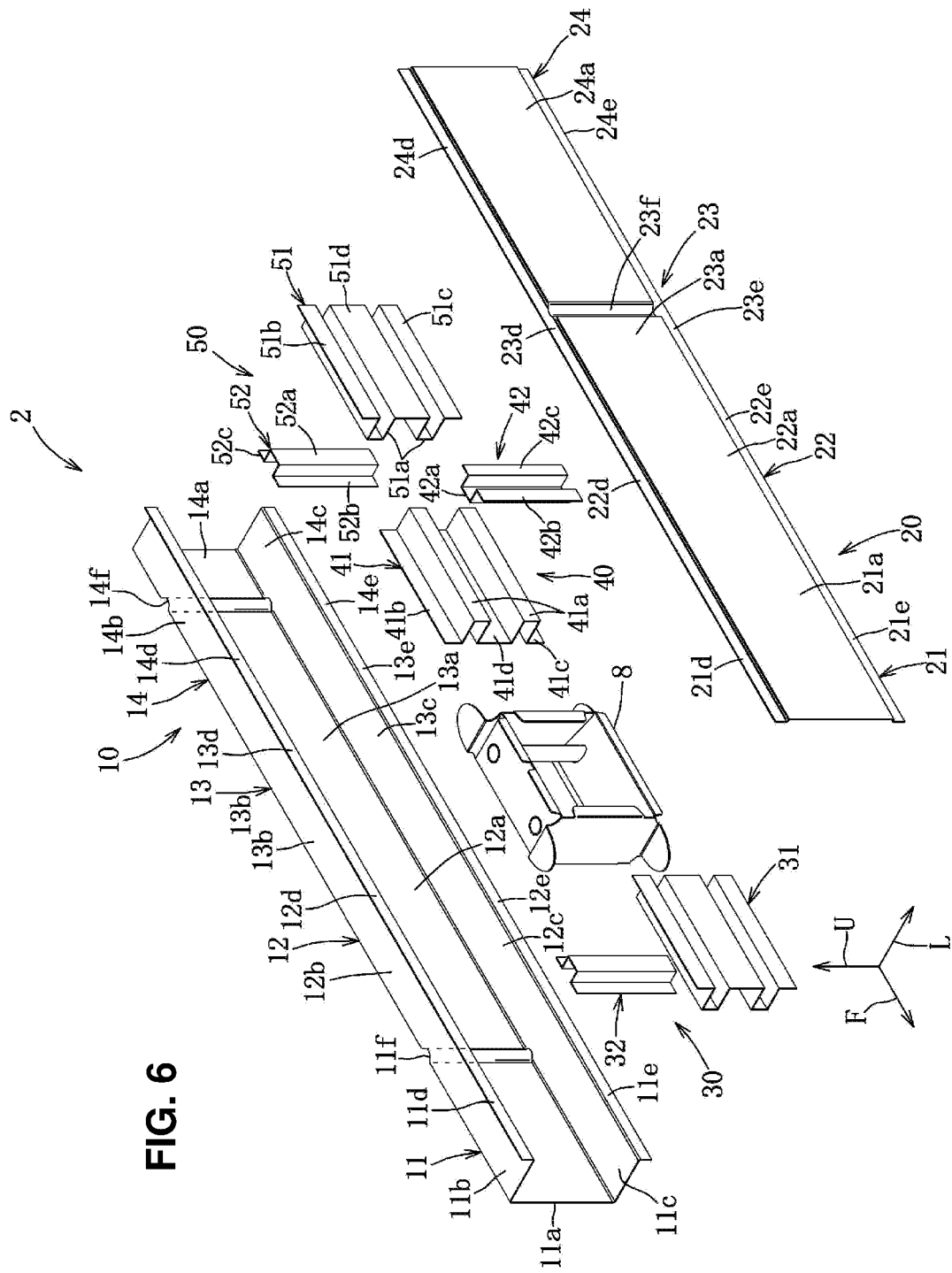
FIG. 6 is an exploded perspective view of the right-side front side frame.

Next, the second reinforcement 40 will be described. As shown in FIG. 6, the second reinforcement 40 is provided in the main closed cross section C at a position corresponding to the intermediate area 2c, which comprises a first reinforcing member 41 and a second reinforcing member 42 similarly to the first reinforcement 30. The first reinforcing member 41 is made of a single steel plate through pressing and formed in the longitudinally-long shape. This first reinforcing member 41 comprises a pair of upper-and-lower body portions 41a, each of which has a roughly U-shaped cross section, an upper flange portion 41b which extends upward from an upper end portion of the upper body portion 41a, a lower flange portion 41c which extends downward from a lower end portion of the lower body portion 41a, and a connection portion 41d which interconnects the lower end portion of the upper body portion 41a and the upper end portion of the lower body portion 41a. The first reinforcing member 41 forms a pair of upper-and-lower first sub closed cross section c1 by joining the upper flange portion 41b, the lower flange portion 41c, and the connection portion 42d to the tension-side wall portion 13a.

The second reinforcing member 42 is made of a single steel plate through pressing and formed in the vertically-long shape. This second reinforcing member 42 comprises a body portion 42a which has a U-shaped cross section, a front flange portion 42b which extends forward from a front end portion of the body portion 42a, and a rear flange portion 42c which extends rearward from a rear end portion of the body portion 42a. The second reinforcing member 42 is joined to the compression-side wall portion 23a at its front flange portion 42b and its rear flange portion 42c in a state in which the body portion 42a faces the bead portion 23f with a specified distance (gap) between the body portion 42a and the bead portion 23f, so that a second sub closed cross section c2 is formed between the second reinforcing member 42 and the compression-side wall portion 23a.

Next, the third reinforcement 50 will be described. As shown in FIG. 6, the third reinforcement 50 is provided in the main closed cross section C at a position corresponding to the rear area 2d, which comprises a first reinforcing member 51 and a second reinforcing member 52 similarly to the first reinforcement 30. The first reinforcing member 51, similarly to the first reinforcing member 31, comprises a pair of upper-and-lower body portions 51a, each of which has a roughly U-shaped cross section, an upper flange portion 51b, a lower flange portion 51c, and a connection portion 51d. The first reinforcing member 51 forms a pair of upper-and-lower first sub closed cross sections c1 by joining the upper flange portion 51b, the lower flange portion 51c, and the connection portion 51d to the tension-side wall portion 24a.

This second reinforcing member 52 comprises a body portion 52a which has a U-shaped cross section, a front flange portion 52b, and a rear flange portion 52c. The second reinforcing member 52 is joined to the compression-side wall portion 14a at its front flange portion 52b and its rear flange portion 52c in a state in which the body portion 52a faces the bead portion 14f with a specified distance (gap) between the body portion 52a and the bead portion 14f, so that a second sub closed cross section c2 is formed between the second reinforcing member 52 and the compression-side wall portion 14a.

Figure 7:
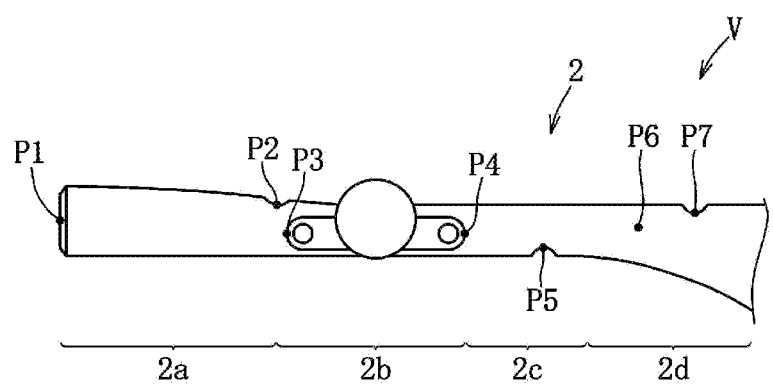
FIG. 7 is a schematic diagram showing a state of a vehicle before a vehicle head-on collision load is inputted.

Subsequently, operations and effects of the frame structure for the vehicle of the present embodiment will be described. Deformation moves of the frame structure when the vehicle V has the head-on collision will be described referring to FIGS. 7-9. As shown in FIG. 7, plural points extending roughly straightly in the longitudinal direction are set at the front side frame 2 for convenience of explanation so that a positional relationship after deformation can be easily understood. A first point P1 shows a front end position of the front area 2a, a second point P2 shows a forming position of the first bead portion 11f of the front area 2a, a third point P3 shows a front end position of the mount area 2b, a fourth point P4 shows a rear end position of the mount area 2b, a fifth point P5 shows a forming position of the second bead portion 23f of the intermediate area 2c, a sixth point P6 shows a boundary position of the intermediate area 2c and the rear area 2d, and a seventh point P7 shows a forming position of the third bead portion 14f of the rear area 2d, respectively.

Figure 8:
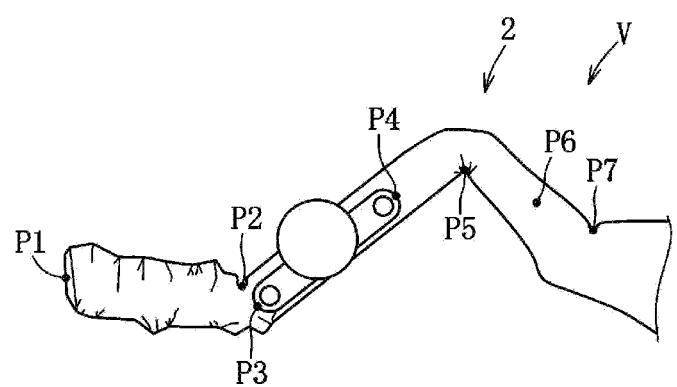
FIG. 8 is a schematic diagram showing a state of the vehicle after the vehicle head-on collision load is inputted.

When the load which has not been absorbed by the axially-compressive deformation of the crash can 6 acts from the vehicle front side, the front side frame 2 absorbs the impact energy by actively generating its compressive deformation and its vehicle-width-direction bending deformation. As shown in FIG. 8, when the collision body collides with the front side frame 2, the load acting along an axial center of the front side frame 2 is inputted to a front end of the front area 2a. The inputted load acts on the first point P1 as the axially-compressive load. At the front end portion of the front area 2a is generated the uniform, in the longitudinal (axial center) direction, axially-compressive deformation, so that the EA (Energy Absorption) is increased by this axially-compressive deformation. The load which has not been absorbed by the axially-compressive deformation is transmitted to the second point P2.

Figure 9A:
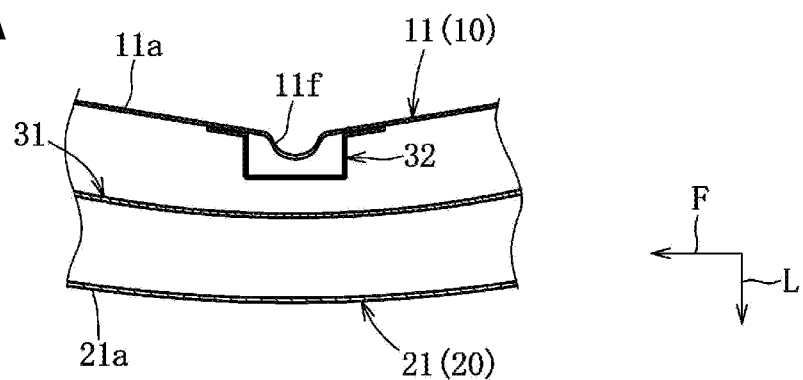
FIGS. 9A, 9B and 9C are lateral sectional views of a front-side area of the front side frame, FIG. 9A showing a load-input initial stage, FIG. 9B showing a load-input middle stage, and FIG. 9C showing a load-input late stage.
Figure 9B:
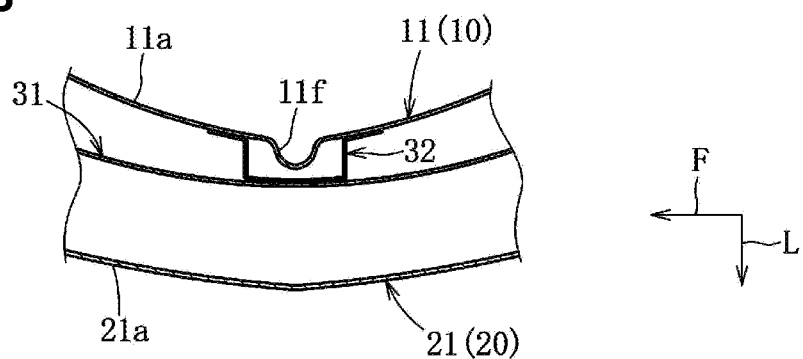
Figure 9C:
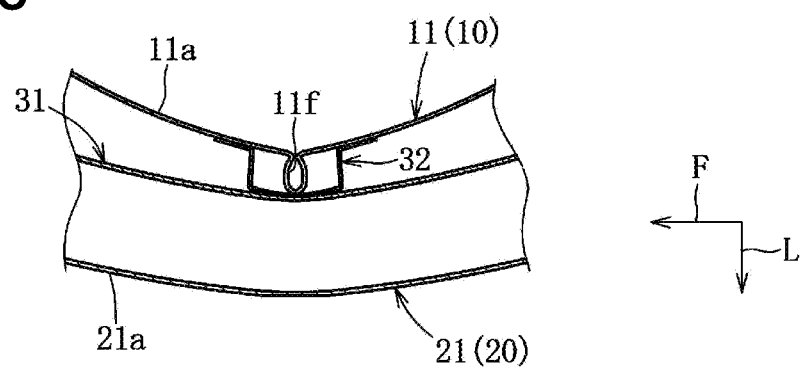

Since the first bead portion 11f to be a causing point of the bending deformation of the second point P2 is formed at the outer member 10, the transmitted load acts on the second point P2 as an outward bending load. Since the first reinforcing member 31 is joined to the tension-side wall portion 21a, being spaced apart from the compression-side wall portion 11a, as shown in FIG. 9A, this first reinforcing member 31 does not directly resist buckling of the compression-side wall portion 11a having the causing point of the bead portion 11f. Accordingly, this buckling occurs with a relatively small load. As the buckling progresses, the second reinforcing member 32 comes to contact the first reinforcing member 31 as shown in FIG. 9B. The first reinforcing member 31 suppresses free deformation of the compression-side wall portion 11a through the second reinforcing member 32 and also suppresses free deformation of the tension-side wall portion 21a, so that the effective EA is generated. After a bottom of the bead portion 11f contacts the second reinforcing member 32, the compression-side wall portion 11a and the tension-side wall portion 21a deform together with the first and second reinforcing members 31, 32 as shown in FIG. 9C, so that the above-described EA lasts until the end of the buckling. Thus, the EA is increased by the bending deformation at the front area 2a, without increasing an allowable limit load.

The load inputted from the front area 2a is transmitted to the intermediate area 2c, without being dispersed to any other portion, by using the structure of the mount reinforcement 8 provided at the mount area 2b. The mount reinforcement 8 has a high rigidity, so the load which has been inputted to the third point P3 without being absorbed at the front area 2a is efficiently transmitted to the second reinforcement 40 from the fourth point P4.

Since the second bead portion 23f as the causing point of the bending deformation is formed at the inner member 20, the transmitted load acts on the fifth point P5 as an inward bending load. At the intermediate area 2c as well as the front area 2a, the EA is increased by the inward bending deformation with the causing point of the second bead portion 23f. The load having not been absorbed at the intermediate area 2c is transmitted to the rear area 2d via the sixth point P6. Since the third bead portion 14f as the causing point of the bending deformation is formed at the outer member 10, the transmitted load acts on the seventh point P7 as the outward bending load. At the rear area 2d as well as the front area 2a, the EA is increased by the outward bending deformation because of cooperation of the third bead portion 14f and the third reinforcement 50.

Figure 10A:
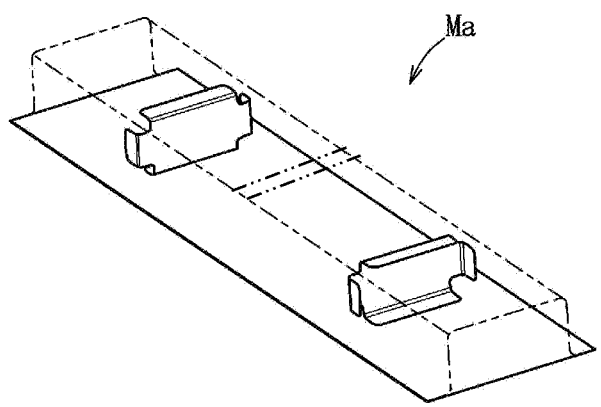
FIGS. 10A, 10B and 10C are explanatory diagrams of a frame model for analysis, FIG. 10A being a perspective view of a frame model Ma, in which first and second reinforcing members are removed (omitted), FIG. 10B being a perspective view of a frame model Mb, in which the second reinforcing member is removed (omitted), and FIG. 10C being a perspective view of a frame model Mc, which corresponds to the present embodiment.
Figure 10B:
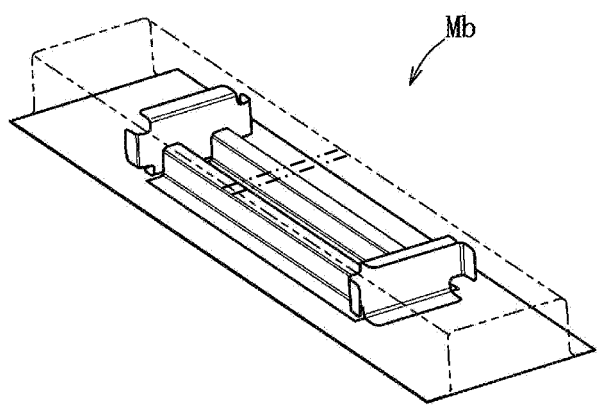
Figure 10C:
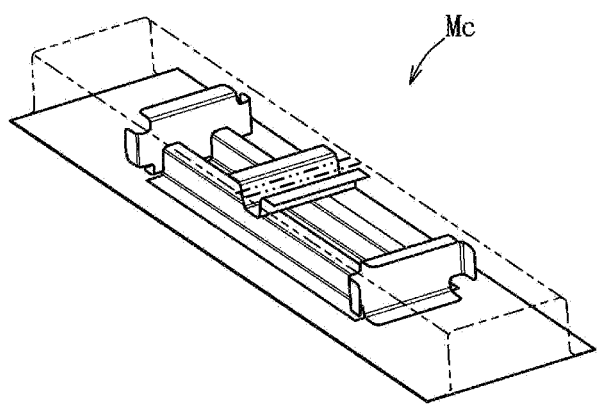

Next, as shown in FIGS. 10A-10C, frame models Ma-Mc equipped with the bead portion as the buckling causing point were prepared and FS characteristics of the frame models Ma-Mc were analyzed by CAE. The frame model Ma is a model in which the first and second reinforcing members 31, 32 of the present embodiment are removed (omitted) and partition members are provided at its front-and-rear end portions. The frame model Mb is a model in which there are provided the first reinforcing member 31 of the reinforcement 30 of the present embodiment and the partition members positioned at front-and-rear end portions of the first reinforcing member 31. The frame model Mc is a model in which there are provided the first and second reinforcing members 31, 32 of the present embodiment and the partition members positioned at the front-and-rear end portions of the first reinforcing member 31. Herein, by applying a load to bend each axial center of the frame models Ma-Mc in a state in which both end portions of each of the frame models Ma-Mc are interposed, analyses of displacement of a load point and a reaction force of the load point were conducted.

Figure 11:
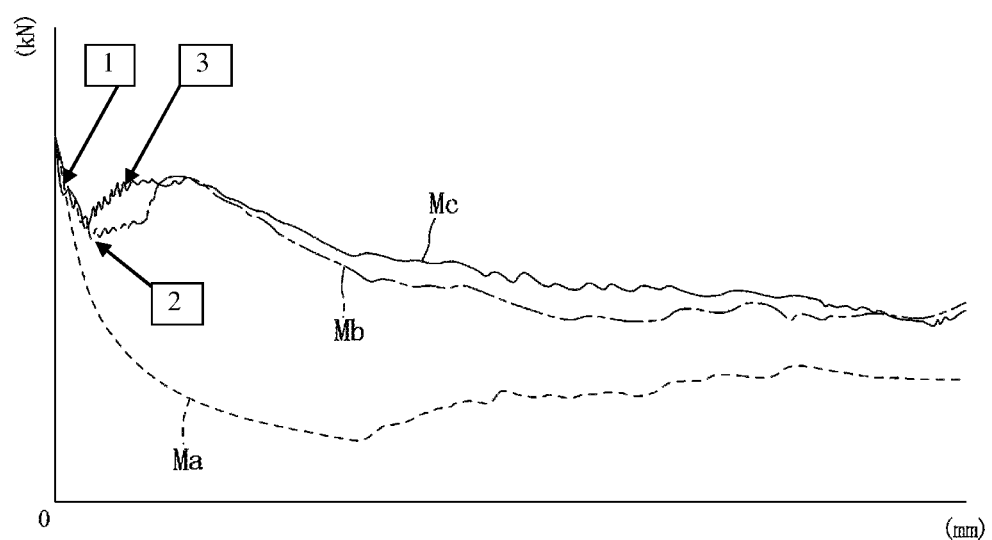
FIG. 11 is a graph showing the FS characteristics of the respective frame models.

FIGS. 11 and 12 show analysis results of the CAE. In the FS characteristics, the ordinate denotes the load (kN) and the abscissa denotes a stroke (mm) As shown in FIG. 11, the frame model Ma shows the lowest EA because the buckling occurs at the allowable limit load right after the load application and the load drops largely in a second half period after occurrence of the buckling. This is a typical buckling phenomenon of a hollow rectangular pipe. The compression-side wall portion and the tension-side wall portion deform in conjunction via a pair of vertical wall portions. Plates of the respective wall portions are regulated only by the adjacent wall portions, so that these plates easily deform and bend. Consequently, the generated EA is relatively small over a whole area. In the frame model Mb, while the load when the buckling occurs at the bead portion is the same as that in the frame model Ma, the load's drop is small (see 1) because the first reinforcing member resists the bending of the tension-side wall portion of the frame. After the bottom portion of the bead portion contacts the first reinforcing member as the bending progresses (see 2), the first reinforcing member, the compression-side wall portion, and the tension-side wall portion deform, regulating each other. Accordingly, the plates of the respective wall portions do not bend simply, but bend in a complex manner including tensioning and compressing, so that the large EA continues to be generated.

Figure 12A:
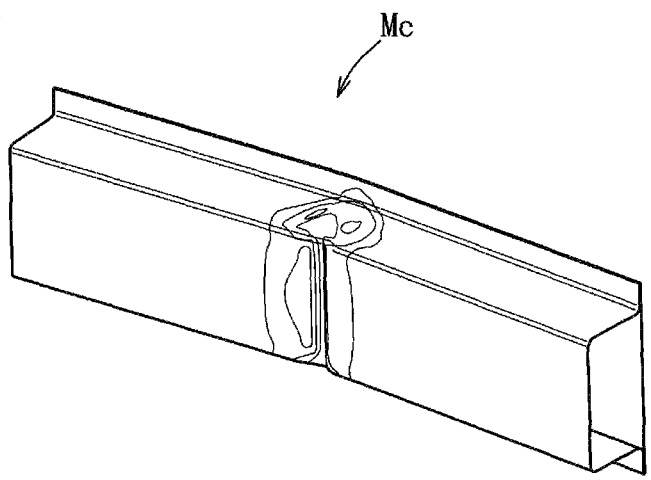
FIGS. 12A and 12B show the frame model Mc, FIG. 12A being a perspective view of a deformation initial stage, and FIG. 12B being a perspective view of a deformation late stage.
Figure 12B:
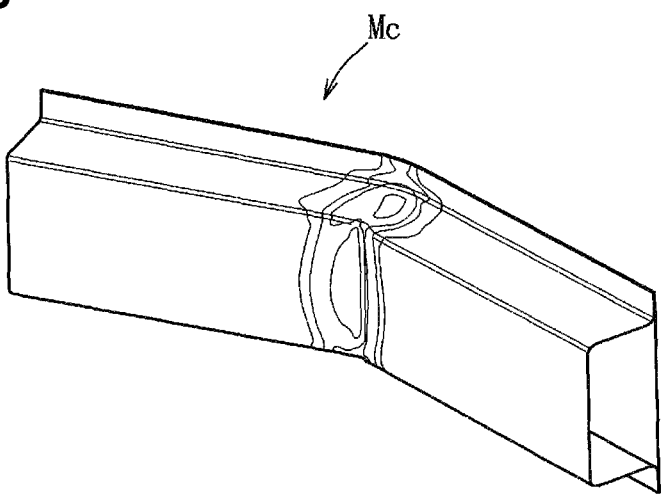

The frame model Mc according to the present invention has substantially the same allowable limit load as the frame model Ma, and the load of this frame model Mc increases in a second half period after buckling and there occurs no period of load largely-dropping after the first allowable limit load. In the frame model Mc, the load where the buckling starts occurring at the bead portion is the same as that of the frame model Ma, and the load's drop is small (see 1) because the first reinforcing member resists the bending of the tension-side wall portion of the frame. The difference from the frame model Mb is that the second reinforcing member contacts the first reinforcing member quickly and surely and the deformation by cooperation of the first reinforcing member, the compression-side wall portion and the tension-side wall portion is made to occur from an earlier timing (see 3). FIGS. 12A and 12B show frame appearances at the timing right before a contact of the second reinforcing member with the first reinforcing member (FIG. 12A) and at the intermediate stage of the deformation by cooperation of the first reinforcing member, the compression-side wall portion and the tension-side wall portion (FIG. 12B). Concentric circular lines around the bead portion show a distribution of stress which is generated inside the plate. As apparent from FIG. 12B, it is found that outward crest-shaped bending of the vertical wall portion near the bead portion, which is seen in the typical buckling phenomenon of the hollow rectangular pipe, is small. For example, at this portion of the plate, the plate does not bend simply but is extended, so that the large EA is generated.

According to the present frame structure for the vehicle, since the frame structure comprises the bead portion 11f (23f, 14f) which is provided at the compression-side wall portion 11a (23a, 14a) to be recessed toward the inside of the main closed cross section C, the buckling position is regulated and the timing of the buckling right after the vehicle collision is accelerated, so that it can be properly prevented that the start timing of the bending of the frame at the initial stage of the vehicle collision is so delayed that the collision impact (acceleration) acting on the vehicle becomes extremely and temporally large. Further, since the frame structure comprises the first reinforcing member 31 (41, 51) provided in the main closed cross section C, which forms the first sub closed cross sections c1 extending longitudinally and being spaced apart from the compression-side wall portion 11a (23a, 14a) together with the tension-side wall portion 21a (12a, 24a), the increase of the allowable limit load occurring right after the vehicle collision can be suppressed, achieving the light weight structure. Further, since the first reinforcing member 31 (41, 51) is spaced apart from the second reinforcing member 32 (42, 52) which forms the second sub closed cross section c2 vertically extending in the main closed cross section C together with the compression-side wall portion 11a, (23a, 14a) and is provided to face at least part of the bead portion 11f (23f, 14f), any contact of the bead portion 11f (23f, 14f) with the first reinforcing member 31 (41, 51) right after the vehicle collision can be suppressed, so that the EA can be increased, achieving the light weight structure.

Since the bead portion 11*f* (23*f*, 14*f*) is provided to extend longitudinally in perpendicular and the second reinforcing member 32 (42, 52) is provided to be spaced apart from the bead portion 11*f* (23*f*, 14*f*), the start timing of the buckling occurring at the compression-side wall portion 11*a* (23*a*, 14*a*) right after the vehicle collision can be further accelerated and also any contact of the bead portion 11*f* (23*f*, 14*f*) with the first reinforcing member 31 (41, 51) can be further suppressed.

Since the first reinforcing member 31 (41, 51) forms the plural first sub closed cross sections c1 which extend longitudinally, being spaced vertically apart from each other, together with the tension-side wall portion 21*a* (13*a*, 24*a*), the second-half load after of the buckling can be increased, thereby increasing the EA further.

Lastly, partial modifications of the above-described embodiment will be described.

1] While the above-described embodiment exemplified the front side frame, the present invention is applicable to any frame for the vehicle, such as a rear side frame, a suspension cross member, a bumper beam, a center pillar, or an impact bar, where a compressive load and a tensional load act.

2] While the above-described embodiment exemplified the frame for the vehicle in which there are provided the two outward-bending deformation portions and the single inward-bending deformation portion and the reinforcements are provided at all these deformation portions, the reinforcement may be provided at either one of these deformation portions. Further, a single outward-bending or inward-bending deformation portion may be provided at the frame for the vehicle.

3] While the above-described embodiment exemplified the frame for the vehicle in which the two body portions extending longitudinally are provided at the first reinforcing member, the present invention is applicable to a frame in which a single body portion is provided or three or more body portions are provided. Further, while the single second reinforcing member is provided to face the bead portion over the bead portion's vertical range, it may be provided to face the bead portion part of the bead portion or plural second reinforcing members may be provided to face the bead portion partially. Moreover, the amount of EA or the collision impact (acceleration) acting on the vehicle in the vehicle collision can be adjusted at the best by controlling the gap (distance) between the first reinforcing member and the second reinforcing member.

4] The present invention should not be limited to the above-described embodiment, and any other modifications or improvements may be applied within the scope of a spirit of the present invention.

What is claimed is:

1. A frame structure for a vehicle, in which a frame having a rectangular closed cross section is configured to bend when receiving a vehicle collision load, the bending frame comprising a compression-side panel, a tension-side panel, and a pair of short side panels which connect respective upper and lower end portions of the compression-side panel and the tension-side panel, the frame structure for the vehicle comprising:

a bead portion provided at the compression-side panel of the frame to be recessed toward an inside of the closed cross section of the frame and extend toward the pair of short side panels of the frame;

a first reinforcing member provided in the closed cross section of the frame and joined to an inner face of the tension-side panel of the frame so as to form a first sub cross section extending in a longitudinal direction of the frame between the tension-side panel of the frame and the first reinforcing member; and a second reinforcing member provided in the closed cross section of the frame and joined to an inner face of a portion of the compression-side panel of the frame where the bead portion is provided so as to form a second sub cross section extending toward the pair of short side panels of the frame between the portion of the compression-side panel of the frame and the second reinforcing member, wherein said first and second reinforcing members are configured such that respective inside end portions thereof are spaced apart from each other.

2. The frame structure for the vehicle of claim 1, wherein said second reinforcing member includes a pair of leg portions which are joined to said inner face of the portion of the compression-side panel of the frame such that said bead portion is interposed between the pair of leg portions of the second reinforcing member.

3. The frame structure for the vehicle of claim 1, wherein said second reinforcing member is configured to vertically extend substantially over an entire range of said compression-side panel of the frame.

4. The frame structure for the vehicle of claim 1, wherein said first reinforcing member is comprised of two members which are provided separately from each other such that two independent first sub cross sections extend in the longitudinal direction of the frame.

5. The frame structure for the vehicle of claim 4, wherein said first reinforcing member is made of a single plate such that a middle portion of the single plate which is positioned between said two independent first sub cross sections is joined to said tension-side panel of the frame.

6. The frame structure for the vehicle of claim 1, wherein said compression-side panel and said pair of short side panels are made of a single plate, and said pair of short side panels include a pair of flange portions which are joined to respective end portions of said tension-side panel.

* * * * *